United States Patent [19]
Khvostov

[11] Patent Number: 6,057,683
[45] Date of Patent: May 2, 2000

[54] INDUCTION SENSOR HAVING CONDUCTIVE CONCENTRATOR WITH MEASURING GAP

[75] Inventor: Vitold A. Khvostov, Kiev, Ukraine

[73] Assignee: Cashcode Company Inc., Concord

[21] Appl. No.: 09/050,919

[22] Filed: Mar. 31, 1998

[51] Int. Cl.[7] .......................... G01R 33/12; G01N 27/72; G07D 7/04; G01V 3/10
[52] U.S. Cl. .......................... 324/236; 324/262; 194/213; 194/320
[58] Field of Search .................................... 324/228–234, 324/236–243, 207.16, 207.26, 262; 235/449, 450; 209/567, 569; 194/210, 213, 319, 320; 361/180

[56] References Cited

U.S. PATENT DOCUMENTS

| | | | |
|---|---|---|---|
| 4,088,953 | 5/1978 | Sarian | 324/232 |
| 4,204,159 | 5/1980 | Sarian et al. | 324/232 |
| 4,234,848 | 11/1980 | Diem et al. | 324/237 X |
| 4,864,234 | 9/1989 | Brooks | 324/238 X |
| 5,617,024 | 4/1997 | Simpson et al. | 324/240 X |
| 5,640,754 | 6/1997 | Lazzari et al. | |

FOREIGN PATENT DOCUMENTS

| | | |
|---|---|---|
| 42 07 798 | 9/1993 | Germany . |
| 2173000 | 10/1986 | United Kingdom . |

Primary Examiner—Gerard Strecker

[57] ABSTRACT

An induction head for sensing a magnetic strip or other magnetically permeable security structures includes an exciting coil associated with an electrically conductive concentrator, which produces a primary field and induces a responsive secondary field in the concentrator. The concentrator has an endwall and sidewalls defining a central cavity. The endwall has a narrow measuring gap dividing the endwall into two opposed sections. The sidewalls are also interrupted adjacent the measuring gap to cause a concentrated current of the secondary field to pass along the gap. This concentrated current can be monitored for a change in induction due to the presence of an elongate magnetic strip or other magnetically permeable security structure which is moved past the measuring gap.

19 Claims, 2 Drawing Sheets

6,057,683

INDUCTION SENSOR HAVING CONDUCTIVE CONCENTRATOR WITH MEASURING GAP

FIELD OF THE INVENTION

The present invention is directed to an induction head for use in detection of a magnetic layer or conducting element passed in close proximity to the induction head. The induction head has particular application for use in association with verification devices and security devices where a substrate is passed beneath the head and has electromagnetic conducting elements associated therewith which need to be detected.

BACKGROUND OF THE INVENTION

Certain documents such as bank notes are fabricated with security threads having a conducting metal coating thereon which can be detected and are difficult to copy. There are various security devices which are able to detect the presence of these security threads by passing them beneath a magnetic head. The induction of the magnetic head changes when a material characterized by high magnetic permeability, such as a security thread, is placed in the magnetic field of the magnetic head, and in close proximity to the magnetic head. The induction head is part of the electric circuitry so that any changes in its induction causes respective changes in the operating characteristics of the circuitry. Most magnetic heads used for detection of security threads, contain a ferromagnetic core used to enhance the magnetic field in close proximity to the bank note pathway.

Although the ferromagnetic magnetic material enhances the magnetic field and allows concentration of the magnetic field, this enhancement changes as a function of ambient temperature, pressure and extraneous magnetic field. These factors have an impact on the magnetic permeability of the ferromagnetic cores and thus, some changes in the circuitry signal may be caused by changes in these factors, as opposed to the presence of a material which has high magnetic permeability.

The present invention departs from the accepted approach of using a ferromagnetic material to enhance the magnetic field as is common in the prior art. The present structure uses a combination of components and a unique concentrator for producing a secondary magnetic field which can be placed in close proximity to a bank note, for detecting of security threads or other magnetically permeable security structures.

SUMMARY OF THE INVENTION

An induction head for sensing a magnetic strip or other magnetically permeable security structure, according to the present invention, comprises an exciting coil associated with an electrically conductive concentrator. The exciting coil produces a primary field which induces a responsive secondary field in said concentrator. The concentrator has an endwall and sidewalls defining a central cavity. The endwall of the concentrator has a narrow measuring gap dividing the endwall into two opposed sections. The sidewalls of the concentrator are also interrupted adjacent the measuring gap and in a manner to concentrate the current of said secondary magnetic field to pass along the measuring gap and produce a measuring field at said gap, which can be monitored for change in induction, due to the presence of an elongate magnetic strip or other magnetically permeable security structure, which is moved past the measuring gap.

According to an aspect of the invention, the exciting coil is a round coil located inside the central cavity of the concentrator and the concentrator is generally tubular in shape.

According to further aspect of the invention, the sidewalls of the concentrator are cylindrical and include a vertical slit at one end of the measuring gap which produces the interruption in the sidewalls.

According to yet a further aspect of the invention, the measuring gap and the slit in the sidewalls produce a divide through most of the concentrator and cause a desired redirection and concentration of the secondary current along said measuring gap.

According to yet a further aspect of the invention, the concentrator is made up of an aluminum material.

According to yet a further aspect of the invention, the measuring field has an access perpendicular to the access of the magnetic field produced by the exciting coil.

According to yet a further aspect of the invention, the thickness of the sidewalls of the concentrator is such that the secondary current is concentrated in a skin of the sidewalls immediately adjacent the exciting coil.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
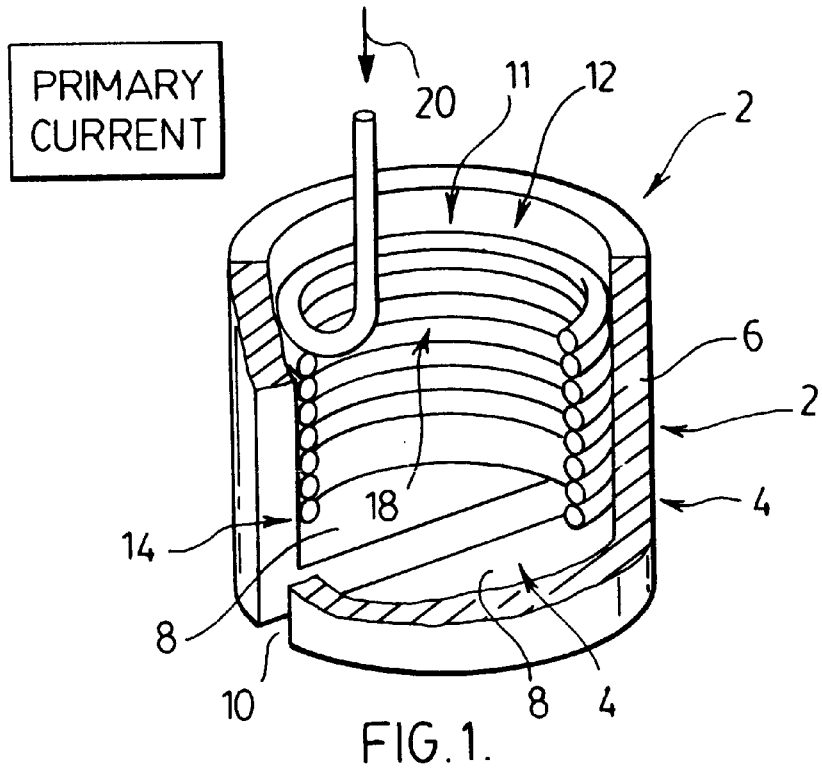
FIG. 1 is a partial perspective cut-away view showing the induction head and the various components thereof.

The induction head 2 shown in FIG. 1 comprises a concentrator 4 made of a material having high electrical conductivity such as aluminum, copper or silver. The concentrator has sidewalls 6, and endwall 8 having a measuring gap 10 formed as an interruption of the endwall 8. The opposite end of the concentrator is open as indicated at 12 defining a central cavity 11. The sidewalls are interrupted or discontinuous as indicated by the interruption 14 which is aligned with the measuring gap 10. The interruptions 10 and 14 cause a desired current concentration of the secondary magnetic field.

A wound coil 18 made of insulated wire is placed inside the concentrator and is in abutment with the sidewalls 6 of the concentrator. The individual windings of the coil are insulated.

Figure 2:
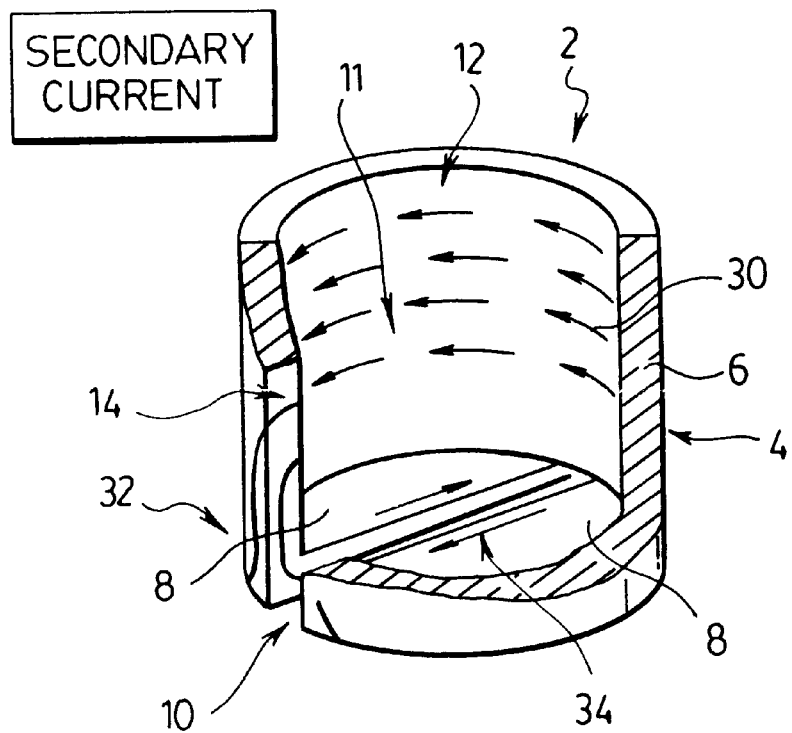
FIG. 2 is a perspective view similar to FIG. 1 with the exciting coil removed and the secondary current shown on the surface of the concentrator.

An exciting current indicated by 20 which preferably is a high frequency signal is used to excite the wound coil and in so doing, produces a primary field directly associated with the wound coil 18. This primary field produces a secondary current, as indicated in FIG. 2. The thickness of the sidewalls 6 of the concentrator 4 and the frequency of the exciting signal 20 produces the secondary currents 30 on the inside surface of the concentrator 4. These secondary currents are on the surface of the concentrator in a small skin layer of the concentrator. The concentrator is many times thicker than this skin layer. As can be appreciated from FIG. 2, the secondary currents on the surface of the concentrator are redirected as indicated at 32 immediately adjacent the interruption 14 provided in the sidewalls 6. This redirection of the secondary currents, causes a concentration of the secondary currents, either side of the measuring gap 10 as indicated at 34. This causes the current to cross the concentrator and then return along the opposite side of the measuring gap 10. When it reaches the far side of the measuring gap, the secondary currents are then redistributed along the inside surface of the concentrator to complete the circuit. With this arrangement, the concentrator produces a redirection of the secondary currents due to the interruption in the sidewalls and a concentration of the currents, either side of the measuring gap. As can be appreciated, the current has now been turned 90° and has an axis perpendicular to the axis of the primary field. The current on either side of the measuring gap has an opposite direction and thus two magnetic fields are formed at the measuring gap. As a conducting strip is passed by the measuring gap and generally aligns with the measuring gap. It first interrupts and changes the first field and then it interrupts and changes the second field. This provides an immediate transition which can easily be detected.

Figures 3, 4, 5:
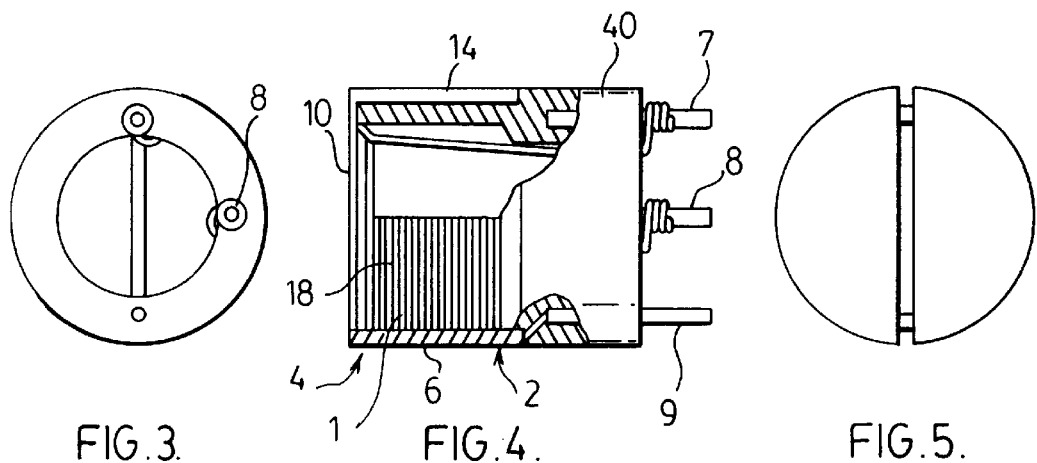
FIG. 3 is a top view of the concentrator.
FIG. 4 is a partial cross-section through the induction head.
FIG. 5 is a bottom view of the induction head.

FIGS. 3, 4 and 5 show further details of the induction head 2. In this case, the concentrator 4 is supported by a frame 40 of an electrically insulating material. This allows the concentrator to be electrically isolated from other supporting structures. The wound coil 18 is still associated with the concentrator 4 and is secured by partial winding around the terminal 7 and terminal 8. The concentrator also has an electrical terminal 9 which is used to allow the concentrator to be used as an electrostatic screen.

The coil 18 is an active part of the circuit for the induction head. It is made in a standard manner, preferably with a copper insulated wire. When choosing a thickness for the wire, it is necessary to proceed from the fact that for the given overall dimensions and operational frequency of the induction head, there exists the optimal thickness of the wire. If the wire is chosen to be too thin, this reduces the induction head quality and negatively affects the possibility of registering small changes in induction. If the wire is chosen to be too thick, it can cause inefficient interaction between the coil and the concentrator or unacceptable head induction.

The concentrator 2 is made up of material with the maximum possible specific conductance. For example, it could be made of aluminum, copper, silver, etc. Its walls are relatively thick such that the secondary currents are in a skin layer at the operational frequency. To increase the axial density of the current in the measuring gap, the height of the gap, i.e. the thickness of the bottom of the concentrator close to the gap, is reduced as much as is practical. This can be achieved by selecting the proper thickness of the bottom in the gap area. The thickness of the bottom is still much larger than the thickness of the skin layer at the operational frequency.

The surface finish in the measuring gap, is of high quality to provide the desired concentration at the measuring gap. It should be noted that the actual shape of the measuring gap and the length and width are selected based on the requirements of the parameters and the configuration of the working area of the induction head.

The main purpose of the concentrator has already been described and it forms the configuration of the magnetic field of the induction head. In addition, this component also allows it to provide an electrostatic screen for the head. This is important as a high frequency signal is used in the head as part of the exciting signal. This high frequency signal ensures the required ratio between the thickness of the skin layer and the bottom of the concentrator. It also affects the sensitivity sensing of the induction head at the operational frequency. The capacitance of the induction head and its electronic circuitry components is small and additional, partial capacitance between the coil and a bank note moving beneath the head may change the impedance of the induction head during the measurement, which change is not due to a security thread making assessment of changes more difficult. On the other hand, the coil is powered with a considerable voltage and its capacitance coupling with other components of the device, at high frequency, may interfere with the operation of these components and cause emission into the environment, thus reducing the electromagnetic compatibility.

Figure 6:
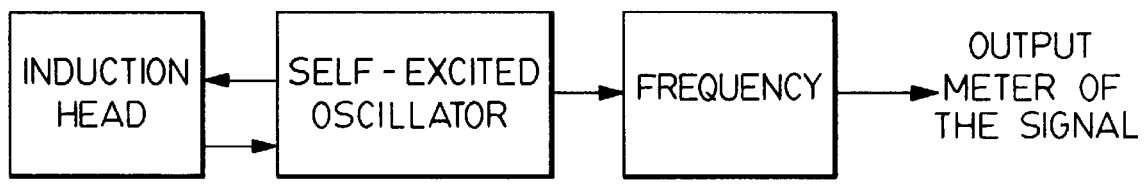
FIG. 6 is a block diagram showing one application of the induction head.

FIG. 6 shows the electronic circuitry used with the induction head. The induction head current in this circuit is converted into the frequency of the self excited oscillator, with its resonant circuits being the ones which the induction head is connected to. This version is of lower quality due to the transformation of the current and absence of ferromagnetic cores. As such, the self-excited oscillator is sensitive to non-impedance frequency destabilizing factors. Furthermore, this very circuit requires that the coupling coefficient (k) between the head and the self-excited oscillator active components should be increased, thereby increasing the impedances of the circuit to a degree wherein active components of the circuit affect the frequency response. In this circuit, isolation measures should be taken to remove disturbances from the circuit of the self-excited oscillator circuit: for instance; stabilizing the voltage of the power supply, shielding the active components of the self-excited oscillator, etc. Further frequency response data processing may be conducted with the application of different standard techniques: with the digital frequency meter, the frequency modulated signal detector, etc.

As the induction head circuit operates at a relatively high operational frequency, the electric field produced at this frequency must be shielded from the working area of the induction head. Further, a bank note moving through the working area has variable dielectric characteristics (due to variations in dielectric permittivity, coefficient of dielectric losses, thickness and positioning in the pathway). These variations in the presence of an electric field in the working area, may give rise to modulations of the frequency of the oscillator (hence, bring about interferences with the sensor operation). To suppress the influence of the high frequency and dielectric variations, the size of the width of the gap in the concentrator's bottom should be minimized. The employment of the concentrator as an electrostatic screen also helps to isolate the working area from external influences. To work properly, the electrical terminal of the concentrator must be connected to a location in the circuit having a constant voltage in relation to other voltages. It is also desirable to connect the coil to the processing circuits such that the wire exiting from the base of concentrator and wound around terminal 7 has a constant potential in relation to all other potentials.

In a preferred embodiment the concentrator is made of aluminum. Its outside diameter is 8 mm, its height is 5 mm, the width of the gap is 0.4 mm, while the thickness of the sidewalls is 0.5 mm and the thickness of the bottom is 0.2 mm. To improve the resistance to wear and proper insulation, the working area of the concentrator is oxidized. The coil is of one-layer design, and it has 20 turns of 0.15

1mm-diameter copper wire with varnished insulation. The coil ends are connected to the terminals pressed in the frame.

Another possible modification has the concentrator consisting of two halves, which means that the gap goes along both sides of the cylindrical surface. In this case the direction of the Foucault currents is a bit different than that shown in FIG. 2, but it also achieves the desired concentration of the magnetic field.

Figure 7:
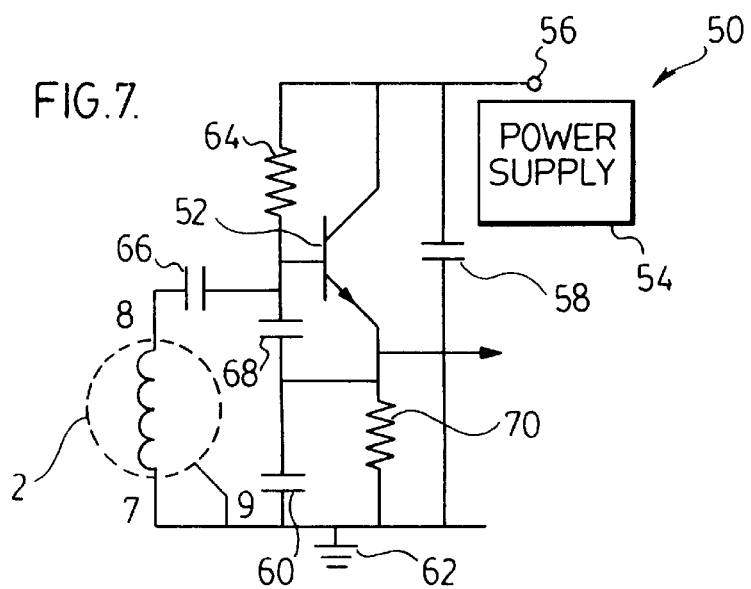
FIG. 7 is a circuit diagram showing the use of the induction head.

The induction head is used in the oscillator designed as a Colpitts oscillator (see FIG. 7). The induction head coil is connected to the oscillator in a manner allowing the end of the coil, closer to the bottom of the concentrator, to be connected to the common terminal of the power supply.

Generally, Colpitts oscillators lower output distortion characteristics. Circuit 50 shows a Colpitts oscillator powered by power supply 54. Concentrator 2 is connected to the circuit at terminals 7 and 9 to ground 62 and terminal 8 to coupling capacitor 66. Transistor 52 drives the circuit. Tuning capacitors 58 and 68 help to determine the resonant frequency of the circuit. The output is taken from terminal 56. Resistors 64 and 70 and capacitor 60 also aid in tuning the circuit.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An induction head for sensing a magnetic strip or other magnetically permeable security structures, said induction head comprising an exciting coil and an electrically conductive concentrator, said concentrator having an endwall and sidewalls defining a central cavity, said exciting coil being located relative to said concentration such that a primary field produced by exciting said coil induces a responsive secondary field in said concentrator, said endwall of said concentrator having a narrow measuring gap dividing said endwall into two opposed sections, said sidewalls also being interrupted adjacent said measuring gap to cause a concentrated current of said secondary field to pass along said gap which can be monitored for a change in induction due to the presence of an elongate magnetic strip or other magnetically permeable security structure which is moved past the measuring gap.

2. An induction head as claimed in claim 1 wherein said exciting coil is a wound coil located inside said central cavity of said concentrator and said concentrator is of a tubular shape.

3. An induction head as claimed in claim 2 wherein said sidewalls are cylindrical and include a vertical slit at one end of said measuring gap which produces said interruption in said sidewalls.

4. An induction head as claimed in claim 3 wherein said measuring gap and said slit in said sidewalls produce a divide through most of said concentrator and causes a desirable redirection and concentration of said secondary current along said measuring gap.

5. An induction head as claimed in claim 3 wherein said concentrator is made of an aluminum material.

6. An induction head as claimed in claim 5 wherein said measuring field has an axis perpendicular to the axis of the magnetic field produced by said exciting coil.

7. An induction head as claimed in claim 1 wherein said head is excited by a high frequency signal producing a secondary current in a skin layer of said concentrator due to the thickness of said concentrator.

8. An induction head as claimed in claim 7 wherein said concentrator is made of aluminum, copper or a silver-based material.

9. An induction head as claimed in claim 1 wherein said exciting coil is interior to said concentrator and in close proximity to the sidewalls of said concentrator.

10. An induction head as claimed in claim 2 wherein said exciting coil is interior to said concentrator and in close proximity to the sidewalls of said concentrator.

11. An induction head as claimed in claim 3 wherein said exciting coil is interior to said concentrator and in close proximity to the sidewalls of said concentrator.

12. An induction head for sensing a magnetic strip or other magnetically permeable security structures, said induction head comprising an exciting coil and an electrically conductive concentrator, said concentrator having an endwall and sidewalls defining a central cavity, said exciting coil cooperating with said concentrator such that a primary field produced by passing a current through said exciting coil induces a secondary current in said sidewalls of said concentrator; said endwall and said sidewalls of said concentrator being interrupted to define a narrow measuring gap dividing said endwall into two opposed sections and to concentrate said secondary current to pass along said measuring gap and be sensitive to changes in induction at said measuring gap, whereby said secondary current can be monitored for a change in induction at said measuring gap due to the presence of an elongate magnetic strip or other magnetically permeable security structure which is moved past the measuring gap.

13. An induction head as claimed in claim 12 wherein said exciting coil is a wound coil located inside said central cavity of said concentrator and in contact with the sidewalls of said concentrator.

14. An induction head as claimed in claim 13 wherein said sidewalls are cylindrical and said interruption in said sidewall is a vertical slit located at one end of said measuring gap.

15. An induction head as claimed in claim 14 wherein said measuring gap and said interruption in said sidewalls generally divide said concentrator into two opposed sections.

16. An induction head as claimed in claim 15 wherein said concentrator is made of an aluminum material.

17. An induction head as claimed in claim 16 wherein said exciting coil has a longitudinal axis which is perpendicular to said measuring gap.

18. An induction head as claimed in claim 12 wherein said head is to be excited by a high frequency signal producing said secondary current in a skin layer of said concentrator due to the thickness of said concentrator.

19. An induction head as claimed in claim 18 wherein said concentrator is made of aluminum, copper or a silver-based material.

* * * * *